United States Patent [19]

Kuivanen

[11] Patent Number: 4,858,755

[45] Date of Patent: Aug. 22, 1989

[54] INFLATABLE DISPLAY CONTAINER

[76] Inventor: Lawrence J. Kuivanen, 17A Pine Needle Dr., Stratford, Conn. 06497

[21] Appl. No.: 147,253

[22] Filed: Jan. 22, 1988

[51] Int. Cl.$^4$ ............................................. B65D 25/00
[52] U.S. Cl. ..................................... 206/45.31; 4/588; 119/5; 206/522; 383/3
[58] Field of Search ................. 206/522, 45.31; 383/3, 383/106; 119/3, 5; 4/488, 506, 585, 588; 52/2 D

[56] References Cited

U.S. PATENT DOCUMENTS

| | | | |
|---|---|---|---|
| 1,643,527 | 9/1927 | Stone | 119/5 |
| 2,237,126 | 4/1941 | Weinman | 206/45.31 |
| 3,631,544 | 1/1972 | Tytel | 4/506 |
| 3,903,665 | 9/1975 | Harrison | 52/171 |
| 3,952,847 | 4/1976 | Via | 383/106 |
| 4,091,852 | 5/1978 | Jordan et al. | 383/3 |
| 4,269,142 | 5/1981 | Hall | 119/5 |
| 4,384,603 | 5/1983 | Tyrer et al. | 383/3 X |

FOREIGN PATENT DOCUMENTS 604575  7/1948  United Kingdom ..................... 119/5

Primary Examiner—Bryon P. Gehman
Attorney, Agent, or Firm—John R. Doherty

[57] ABSTRACT

Disclosed is an inflatable container suitable for use as a portable aquarium. The inflatable container has an upper open end and side walls which are easily and economically constructed from a single sheet of flexible film material. The sheet is folded upon itself into substantially two overlapping half sections with portions of each half section being sealed together to form four side panels. The remaining portions of the overlapping half sections form an inflatable tubular, flexible framework including an upper and a lower tubular rim and at least four upstanding tubular columns which surround the side panels. The tubular framework and side panels are formed with only two sealed seams joining the longitudinal and lateral edges of the film sheet, one of which extends longitudinally along the surface of the lower tubular rim and the other of which extends laterally along the surface of one of the upstanding tubular columns. The upper tubular rim of the framework surrounds the upper open end of the container and is essentially seamless except for a portion of the lateral seam extending along the surface of the upstanding tubular column. A bottom panel is joined to the lower tubular rim and valve means are mounted in the framework for inflating the container.

4 Claims, 3 Drawing Sheets

INFLATABLE DISPLAY CONTAINER

My invention is directed to inflatable containers and more particularly to an inflatable portable aquarium for use as a child's educational product.

There are numerous occasions for children to collect various species of sealife such as small fish, snails and crabs while visiting the beach or ocean resort. To encourage this activity, it would be highly beneficial to provide as an educational product a portable aquarium for a child's use in displaying and identifying the sealife. Most aquariums, however, are made of metal and glass and are heavy, bulky and difficult to carry. Moreover, they may present a serious danger to a child in the event that the glass should break or shatter.

An object of my invention is therefore to provide an inflatable container which can be safely used by children as a portable aquarium.

Another object of my invention is to provide a method of making such an inflatable container which is practical and economical.

BRIEF DESCRIPTION OF THE INVENTION

An inflatable container according to my invention comprises at least four flexible side panels and an inflatable, tubular, flexible framework surrounding the side panels. The framework includes an upper tubular rim, a lower tubular rim and at least four upstanding tubular columns. Each of the side panels is joined to the upper and lower tubular rims and to two of the tubular columns. A flexible bottom panel is joined to the lower tubular rim and a valve means is provided in the framework for inflating the container.

DESCRIPTION OF THE PREFERRED EMBODIMENTS

Figure 1:
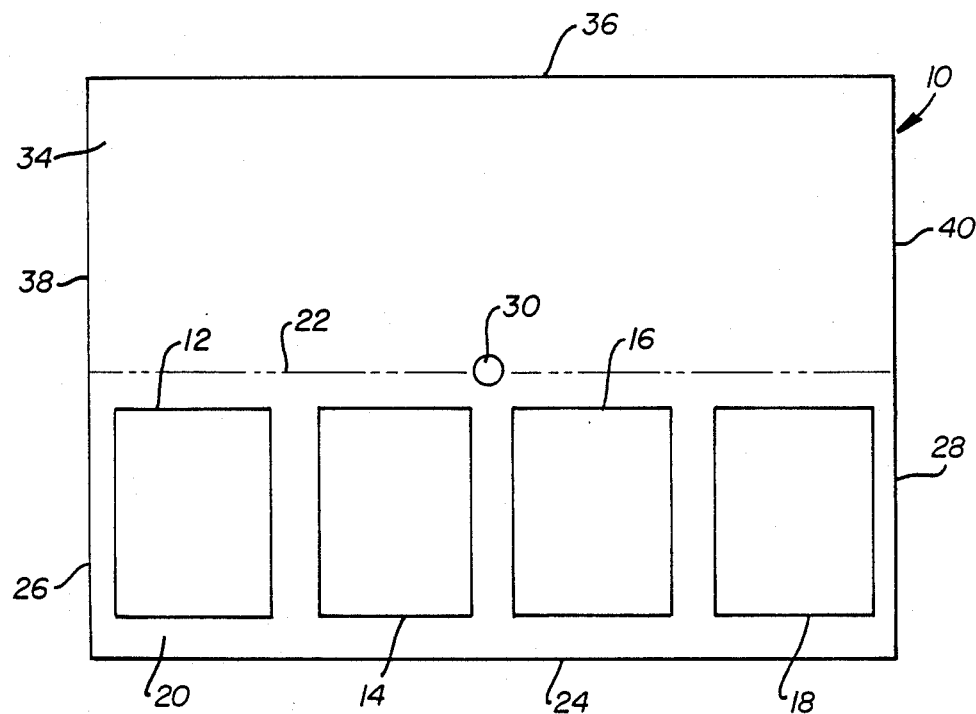
FIG. 1 is a plan view of a flat preformed blank used to make inflatable container according to my invention.

Referring now to FIGS. 1–4, an inflatable container embodying my invention is made from a flat sheet or blank 10 of a clear or transparent flexible film material such as a vinyl film, for example. The blank 10 is cut with a series of four, rectangular, spaced apart, adjacent openings 12, 14, 16 and 18 arranged in a row within one half section 20 of the blank. The openings are spaced apart an equal distance from one another and from both the center line 22 and the opposite longitudinal edge 24 of the blank. However, the first and last openings 12 and 18 are spaced only half that distance from the respective opposite lateral edges 26 and 28. A circular hole 30 is provided on the center line 22 for insertion of a valve member 32 (see FIG. 2).

Figure 2:
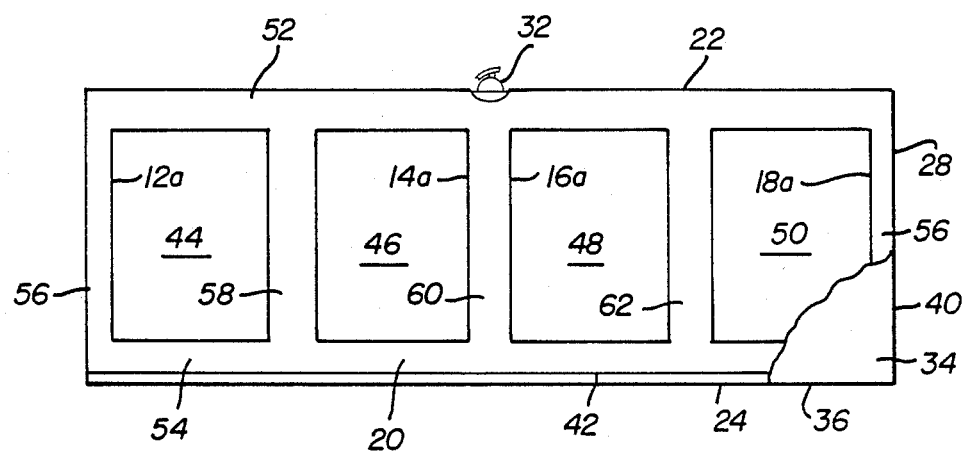
FIG. 2 is a similar view of the partially folded and sealed assembly of the inflatable container.

The next step in the assembly of the container is to fold the first cut half section 20 along the center line 22 onto the other second half section 34 as shown in FIG. 2. The two half sections overlap one another with the longitudinal edge 24 of the first half section 20 coinciding with the longitudinal edge 36 of the second half section 34. Similarly, the opposite lateral edges 26, 28 of the first half section 20 coincide with the opposite lateral edges 38, 40 of the second half section 34.

The two half sections 20, 34 are then joined together by a heat seal along the marginal edge of each opening as shown at 12a, 14a, 16a and 18a, respectively. In a similar fashion, the coinciding longitudinal edges 24 and 36 of each half section are joined together by a heat seal 42.

The portions of the half section 34 encompassed by the marginal heat seals 12a, 14a, 16a and 18a constitute four flexible rectangular side panels 44, 46, 48 and 50, respectively, for the container. The remaining overlapping portions of the two half sections 20, 34 define a tubular framework surrounding the four rectangular panels. This framework includes an upper tubular rim 52, a lower tubular rim 54 and four upstanding tubular columns 56, 58, 60 and 62 joined to the tubular rims 52, 54 (see FIGS. 5-9).

Figure 4:
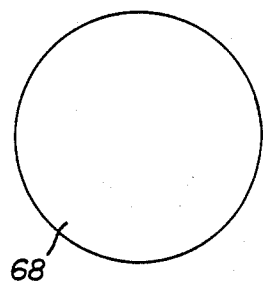
FIG. 4 is a plan view of the bottom panel for the container.
Figure 5:
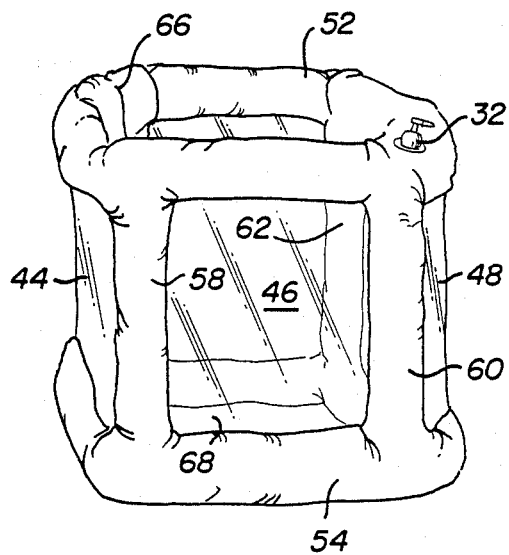
FIG. 5 is a perspective view of the inflated container.
Figure 6:
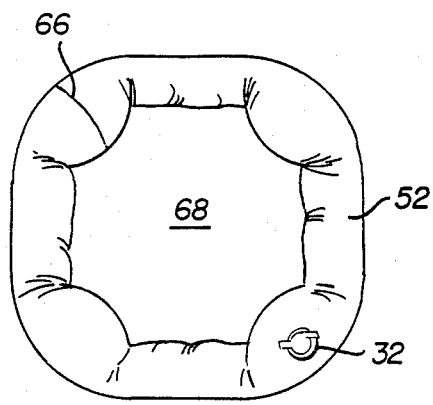
FIG. 6 is a top view of the inflated container.

The sealed half sections 20, 34 are next folded end to end in a loop as shown in FIG. 4. The two opposite lateral edges 38, 40 of the second half section 34 are then joined by a heat seal 64. Similarly, the two opposite lateral edges of the first half section 20 are joined by a head seal 66 (see FIG. 5).

Figure 3:
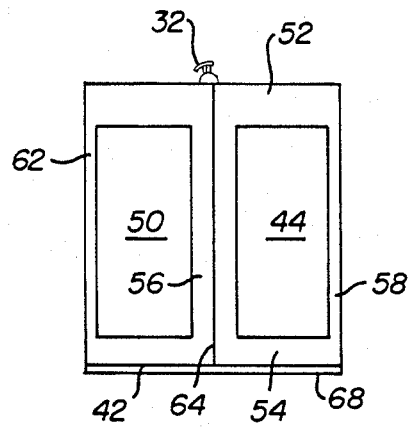
FIG. 3 is a similar view of the assembled container before being inflated.
Figure 7:
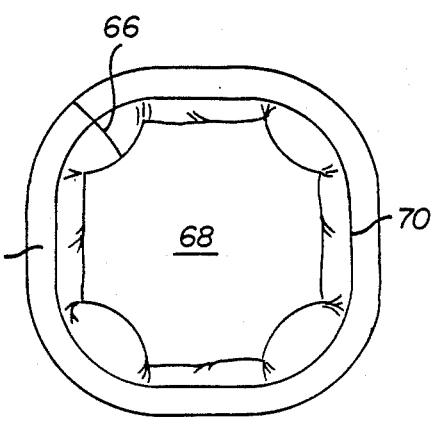
FIG. 7 is a bottom view of the container.
Figure 8:
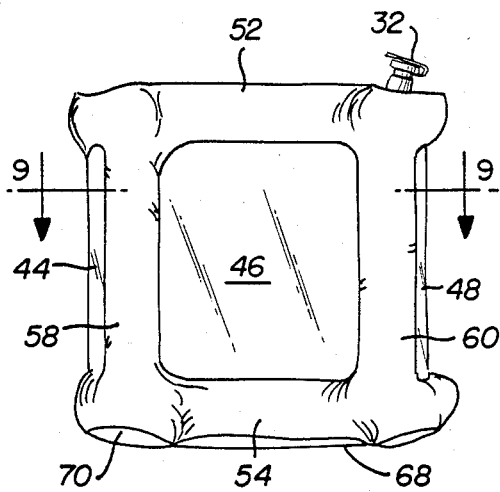
FIG. 8 is a side elevational view thereof.
Figure 9:
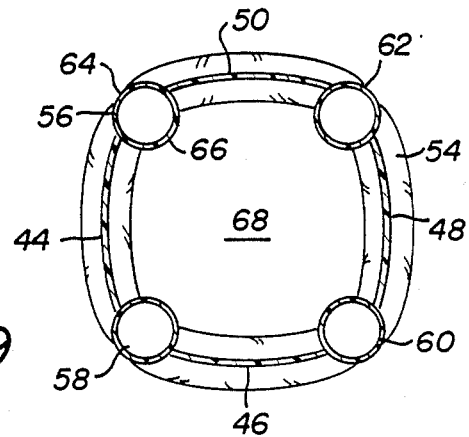
FIG. 9 is a sectional view taken along the line 9—9 in FIG. 8.

A bottom panel 68 made from a flexible film material is provided for the container as shown in FIG. 3. The bottom panel 68 is joined to the lower tubular rim 54 by a heat seal 70 as best shown in FIG. 7.

The valve member 32 is heat sealed or cemented in the circular hole 30 provided in the upper tubular rim 52. The valve member 32 may be of a conventional design including a valve stem and plug, for example.

FIGS. 5–9 show in detail the inflated container according to my invention. The container may be inflated by applying air under pressure to the valve member 32. The pressurized air fills the tubular framework including the upper and lower tubular rims 52, 54 and the columns 56–62 which support the four side panels in the upright position.

An inflatable container according to my invention is intended for use as a inflatable, portable aquarium. The aquarium can be easily stored away in a small space when deflated and not in use. Moreover, the aquarium employs no metal or glass parts and is safe for a child's play.

I claim:

1. An inflatable container having an upper open end, said container comprising:
   at least four flexible side panels;
   an inflatable, tubular, flexible framework surrounding said panels, said framework including an upper and a lower tubular rim and at least four upstanding tubular columns;
   said inflatable, tubular framework and said side panels being formed from a single sheet of flexible film material folded upon itself along a longitudinal fold line into two overlapping, substantially rectangular sections each of which has its opposite lateral edges aligned with the opposite lateral edges of the other section, said overlapping rectangular sections being sealed together by a longitudinal seam extending between the opposite lateral edges of each section at a point spaced from said longitudinal fold line and by at least four continuous seams enclosing at least four separate areas within the space between said longitudinal fold line and said longitudinal seam, each of said overlapping rectangular sections having one of its opposite lateral edges sealed to the other of its opposite lateral edges by a lateral seam extending between said longitudinal fold line and said longitudinal seam, the arrangement being such that each one of said continuous seams defines one of said side panels while the remaining portions of said overlapping rectangular sections form said tubular framework with said longitudinal seam extending along the surface of said lower tubular rim and with said lateral seam extending along the surface of one of said upstanding tubular columns;

said upper tubular rim surrounding said upper open end of said container and being seamless except for a portion of said lateral seam extending along the surface of said one upstanding tubular column;

said upper and lower tubular rims communicating with each other through at least one of said upstanding tubular columns;

a flexible bottom panel joined to said lower tubular rim and covering the bottom end of said container; and a valve mounted in one portion of said framework for inflating the entire framework through said communicating upstanding tubular column.

2. An inflatable container according to claim 1, wherein said flexible side panels are substantially rectangular in shape.

3. An inflatable container according to claim 1, wherein said flexible film material is a vinyl film.

4. An inflatable container according to claim 3, wherein said vinyl film is transparent.

* * * * *